(12) United States Patent
Bucking et al.

(10) Patent No.: US 9,797,409 B2
(45) Date of Patent: Oct. 24, 2017

(54) TURBOCHARGER BEARING HOUSING WITH INTEGRATED HEAT SHIELD

(71) Applicant: BorgWarner Inc., Auburn Hills, MI (US)

(72) Inventors: Michael Bucking, Asheville, NC (US); Daniel N. Ward, Asheville, NC (US)

(73) Assignee: BorgWarner Inc., Auburn Mills, MI (US)

( * ) Notice: Subject to any disclaimer, the term of this patent is extended or adjusted under 35 U.S.C. 154(b) by 486 days.

(21) Appl. No.: 14/387,921

(22) PCT Filed: Mar. 22, 2013

(86) PCT No.: PCT/US2013/033418
§ 371 (c)(1),
(2) Date: Sep. 25, 2014

(87) PCT Pub. No.: WO2013/148486
PCT Pub. Date: Oct. 3, 2013

(65) Prior Publication Data
US 2015/0044037 A1    Feb. 12, 2015

Related U.S. Application Data

(60) Provisional application No. 61/617,944, filed on Mar. 30, 2012.

(51) Int. Cl.
*F04D 29/58*    (2006.01)
*F02B 39/14*    (2006.01)
(Continued)

(52) U.S. Cl.
CPC ......... *F04D 29/5853* (2013.01); *F01D 25/16* (2013.01); *F01D 25/186* (2013.01);
(Continued)

(58) Field of Classification Search
CPC ...... F04D 29/002; F04D 29/58; F04D 29/582; F04D 29/5853; F04D 29/403;
(Continued)

(56) References Cited

U.S. PATENT DOCUMENTS 1,400,323 A * 12/1921 Sherbondy ............ F01D 25/005
                                                    415/200
2,074,184 A *  3/1937 Kirgan .................. F04D 29/582
                                                    415/176
(Continued)

FOREIGN PATENT DOCUMENTS

CH    DE 19648641 A1 *  5/1998 ............. F01D 25/08
CH    WO 0173278 A1 * 10/2001 ........... F01D 25/002
(Continued)

OTHER PUBLICATIONS

ProQuestDocuments—Feb. 22, 2017_DE-19648641_English Machine Translation.*
(Continued)

*Primary Examiner* — Craig Kim
*Assistant Examiner* — Wayne A Lambert
(74) *Attorney, Agent, or Firm* — BrooksGroup (57) ABSTRACT

A system and method is provided in which a turbocharger includes a heat shield wall that is formed together with the bearing housing as a unitary structure. The wall can extend from a main body portion of the bearing housing in a generally radially outward direction. The wall can be spaced from the main body and attached by a plurality of ribs such that chambers are defined therebetween. A circumferential passage can extend through the bearing housing to permit fluid communication between the chambers and outside of the bearing housing. In this way, a fluid outlet from the chambers is provided. As a result of such an arrangement, the need for a separate heat shield is eliminated, which can
(Continued)

facilitate the assembly process and special attachment methods associated with a separate heat shield.

15 Claims, 7 Drawing Sheets

(51) Int. Cl.
    *F01D 25/18*     (2006.01)
    *F01D 25/16*     (2006.01)
    *F02C 6/12*     (2006.01)
    *F04D 29/40*     (2006.01)

(52) U.S. Cl.
    CPC ............... *F02B 39/14* (2013.01); *F02C 6/12* (2013.01); *F04D 29/403* (2013.01); *F05D 2220/40* (2013.01); *F05D 2240/15* (2013.01); *Y10T 29/49236* (2015.01)

(58) Field of Classification Search
    CPC ........ F04D 29/40; F01D 25/16; F01D 25/186; F01D 25/145; F01D 25/08; F05D 2220/40; F05D 2240/14; F05D 2240/15; F02C 6/12; F02B 39/14; Y10T 29/49236
    See application file for complete search history.

(56) References Cited

U.S. PATENT DOCUMENTS

| | | | | |
|---|---|---|---|---|
| 2,822,974 A * | 2/1958 | Mueller | ........... | F01D 25/08 415/186 |
| 4,107,927 A * | 8/1978 | Gordon, Jr. | ........... | F01D 25/125 417/407 |
| 4,122,673 A * | 10/1978 | Leins | ........... | B01D 53/9413 415/177 |
| 5,026,260 A | 6/1991 | Gutknecht et al. | | |
| 5,454,225 A * | 10/1995 | Sumser | ........... | F01D 9/045 415/166 |
| 5,890,881 A * | 4/1999 | Adeff | ........... | F01D 25/145 415/111 |
| 5,964,574 A * | 10/1999 | Meier | ........... | F01D 9/045 415/110 |
| 7,021,057 B2 * | 4/2006 | Sumser | ........... | F01D 17/165 415/163 |
| 7,384,236 B2 * | 6/2008 | Meier | ........... | F01D 25/08 415/178 |
| 7,631,497 B2 | 12/2009 | Panek | | |
| 7,802,429 B2 | 9/2010 | Yokoyama et al. | | |
| 8,092,162 B2 | 1/2012 | Masson et al. | | |
| 2004/0237523 A1 * | 12/2004 | Arnold | ........... | F01D 5/048 60/612 |
| 2010/0196148 A1 | 8/2010 | Gee et al. | | |
| 2015/0292345 A1 * | 10/2015 | Giselmo | ........... | F01D 11/04 415/111 |

FOREIGN PATENT DOCUMENTS

| | | |
|---|---|---|
| CN | 101821481 A | 9/2010 |
| DE | 19648647 A1 | 5/1998 |
| JP | 6149109 A | 3/1986 |
| JP | 63198702 | 8/1988 |

OTHER PUBLICATIONS

Chinese Office Action dated Mar. 3, 2016; Application No. 201380016382.0; Applicant: BorgWarner Inc.; 11 pages.

* cited by examiner

TURBOCHARGER BEARING HOUSING WITH INTEGRATED HEAT SHIELD

FIELD OF THE INVENTION

This invention relates to turbochargers, and, in particular, turbochargers having a heat shield to minimize unwanted transfer of thermal energy from the exhaust gas in the turbine housing to other portions of the turbocharger.

BACKGROUND OF THE INVENTION

Figure 1:
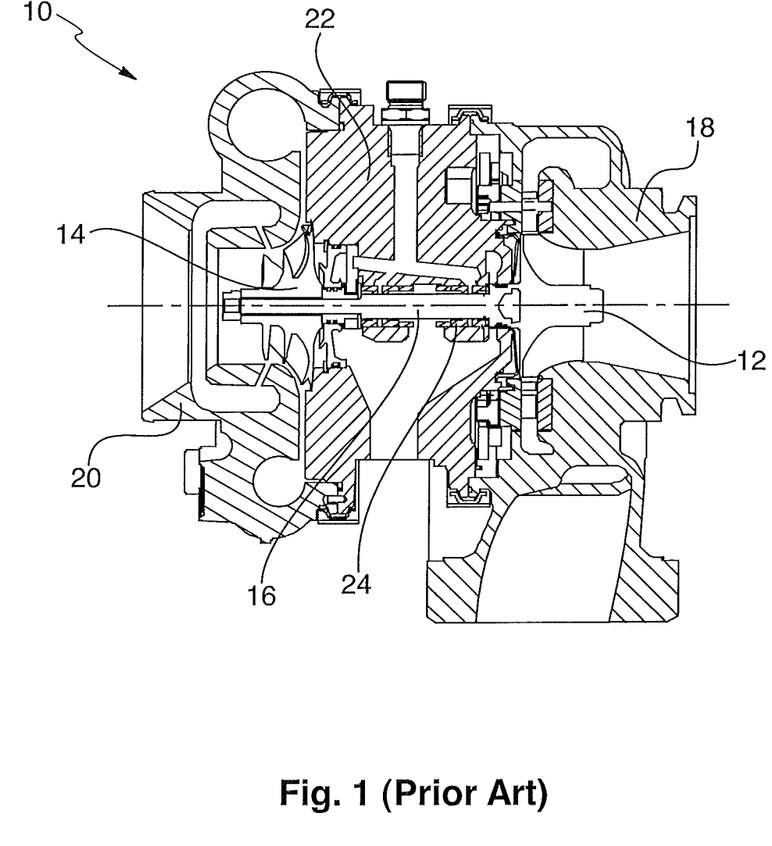
FIG. 1 is a cross-sectional view of a known turbocharger.

Turbochargers are a type of forced induction system. They deliver air to the engine intake at a greater density than would be possible in a typical aspirated engine configuration. As a result, more fuel can be combusted, which, in turn, can boost the engine's horsepower without significantly increasing engine weight. FIG. 1 shows a prior art system in which a turbocharger (10) includes a turbine wheel (12), a compressor wheel (14), and a connecting shaft (16). The turbine wheel (12) is located within a turbine housing (18), and the compressor wheel (14) is located in a compressor cover (20). The turbine wheel (12) is driven by exhaust gas exiting an internal combustion engine. The rotation of the turbine wheel (12) is communicated to the compressor wheel (14) by the shaft (16). The compressor wheel (14) is used to increase the pressure of intake air prior to mixing with fuel and combustion in the engine.

Figure 2:
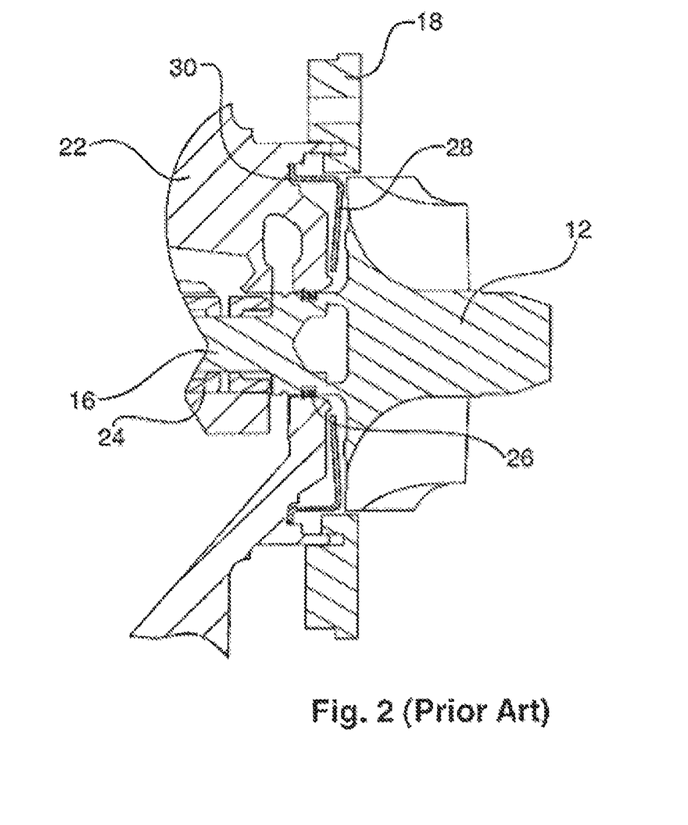
FIG. 2 is a close-up view of a known turbocharger in an area around the turbine wheel.

The shaft (16) extends through a bearing housing (22) and is mounted for rotation in bearings, including journal bearings (24). The speeds at which the shaft (16), turbine wheel (12) and compressor wheel (14) are rotated are very high, and can be in excess of 250,000 rpm. Therefore, the bearings used to support the shaft (16) must be lubricated with pressurized oil. However, the oil in the bearing system is susceptible to breakdown and coking if operating temperatures become too extreme. Further, seal ring(s), such as piston rings 26 (see FIG. 2), are used to restrict the flow of gases and oil from within the bearing housing (22) to the turbine housing (18).

The exhaust gas from the engine is typically at temperatures ranging from 740° C. to 1050° C., depending upon the fuel used. Because of these high temperatures, turbochargers typically use a turbine heat shield (28) which is positioned between the turbine wheel (12) and the bearing housing (22). The heat shield (28) protects the bearing housing (22), the parts within the bearing housing (22), and the compressor stage, from unwanted transfer of thermal energy from the exhaust gas in the turbine housing (18). More particularly, one function of the turbine heat shield (12) is to impede the conductive and radiative flow of heat from the exhaust gas, through the bearing housing (22), to the compressor stage, the efficiency of which can be adversely affected by increases in the temperature of the compressor cover (20). Another function of the turbine heat shield (28) is to impede the flow of heat from the exhaust gas to the piston ring(s) (26) and journal bearings (24).

The heat shield (28) is a separate component that is made of a different material that the bearing housing (22). The material of the heat shield (28), typically an austenitic stainless steel (e.g., SS-321 or SS-348), has a lower coefficient of thermal conductivity than the material of the bearing housing (22), typically cast gray iron or ductile iron. As a result, a stainless steel heat shield (28) can provide more impedance to the conductive transmittal of heat than would be the case if the turbine heat shield (28) was fabricated out of the same cast iron as that used in the bearing housing (22). Thus, providing a separate heat shield made of a different material provides heat transfer advantages.

However, there are many difficulties with the inclusion of a separate heat shield (28) into the turbocharger (10). For instance, the heat shield (28) must be adequately retained so that it is not loose in which it could rattle against the bearing housing (22) or turbine housing (18), or touch the turbine wheel (12) or the shaft (16) and turbine wheel (12), both of which are rotating at very high speed. To that end, the heat shield (28) is typically attached to the bearing housing (22). One common way of attaching the heat shield (28) to the bearing housing (22) is by staking the stainless steel heat shield (28) to the bearing housing (22). In such case, a portion of the bearing housing (22) is deformed over a flange (30) of the heat shield (28). However, the staking procedure is difficult and results in deformation of a portion of the bearing housing (22).

In some turbochargers (e.g., non-VTG turbochargers), the heat shield is retained by sandwiching a portion of the heat shield (e.g. the flange) between the turbine housing and the bearing housing. However, it can be difficult to maintain the clamping load on the heat shield during turbocharger operation. A loss of clamp load can result in gas and soot leakage from the turbocharger to the engine environment. In either manner of attachment (staking or clamping), the concentricity of the bore in the heat shield to the bore of the journal bearings in the bearing housing is not easy to achieve due to the clearances and tolerances required for the assembly of the separate pieces (turbine housing, heat shield, bearing housing) in practice.

Further, the use of a separate heat shield can cause difficulties at the assembly/processing stage of the core assembly (the assembly of the rotating assembly in the supporting bearing housing). During this stage, a core balance procedure is typically performed in which the rotating assembly is spun up to medium-to-high speed, and the balance of the rotating assembly is checked and adjusted where necessary. However, the turbine heat shield is often loose (that is, not fully retained) until it is trapped between the bearing housing and turbine housing at the next step in assembly. As a result, problems can arise at the core balance station. Thus, the heat shield must somehow be kept from touching the rotating assembly during this procedure. This is often done by clipping the heat shield to another structure so it is not hanging freely, or by clamping it in place as part of the high speed core balance procedure. However, such steps are time consuming, challenging and not consistently repeatable.

Thus, there is a need for a heat shield configuration and related system that can minimize one or more of the above concerns.

SUMMARY OF THE INVENTION

According to embodiments herein, a turbine heat shield wall (50) is formed with a main body of a turbocharger bearing housing as a unitary structure. The wall is connected to the main body by a plurality of ribs. In this way, the use of a separate heat shield is eliminated, thereby avoiding problems associated with separate heat shields (e.g., the heat shield coming loose during core balancing or during the assembly process). Further, the heat shield wall can be accurately machined as part of the bearing housing machining. The heat shield wall can protect the bearing housing, the parts within the bearing housing, and the compressor stage, from unwanted transfer of thermal energy from the exhaust gas in the turbine housing.

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

Arrangements described herein relate to device turbocharger having a heat shield formed with the bearing housing. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Arrangements are shown in FIGS. 3-7, but the embodiments are not limited to the illustrated structure or application.

Embodiments described herein can address issues experienced with prior heat shield arrangements by integrating the heat shield into the casting of the bearing housing itself. Examples of such an arrangement are shown in FIGS. 3-7. As is shown, the turbocharger (40) includes a heat shield that can be implemented as a wall (50) formed unitary with the bearing housing (52). The wall (50) can be formed in any suitable manner with the bearing housing (52), such as by casting and/or machining. Thus, the wall (50) and the remainder of the bearing housing (52) can be made of the same material. The wall (50) can extend in a generally radially outward direction relative to the axis of rotation (54) of the shaft (56). More particularly, the wall (50) can extend at substantially 90 degrees relative to the axis of rotation (54) of the shaft (56).

Figure 4:
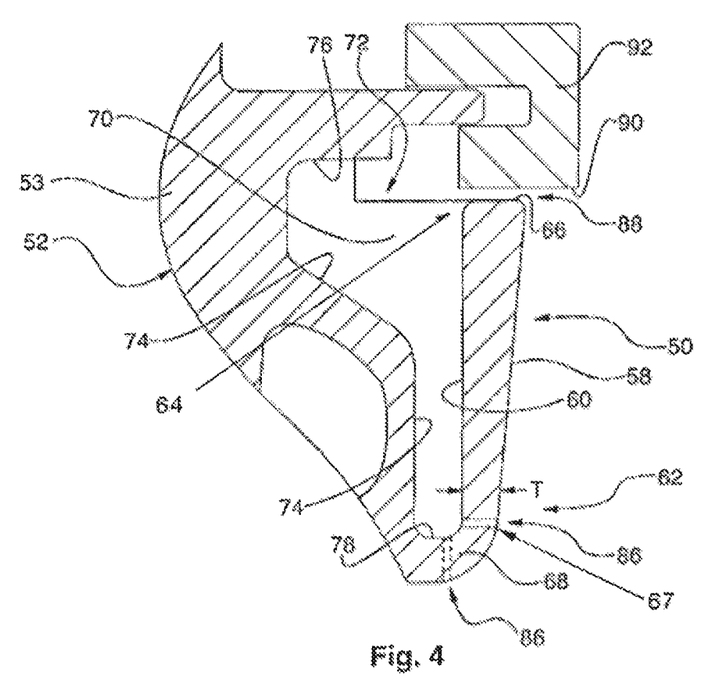
FIG. 4 is a close-up view of a turbocharger having an integrated heat shield.

Referring to FIG. 4, the wall (50) can have a turbine wheel-facing surface (58) and a compressor-facing surface (60). The turbine wheel-facing surface (58) and/or the compressor-facing surface (60) can be substantially planar. The turbine wheel-facing surface (58) and the compressor-facing surface (60) can be substantially parallel to each other. Alternatively, the turbine wheel-facing surface (58) and the compressor-facing surface (60) can be non-parallel to each other.

In some embodiments, at least the turbine wheel facing surface (58) of the outside of the wall (50) can be at least partially covered with a thermal insulating material (not shown), such as a thermal barrier coating (TBC) which can include, for example, titanium diboride, aluminum oxide, alumina-silica, boron nitride; silicon carbide; vitrium oxide; YSZ (yttria stabilized zirconia); and zirconium oxide.

The wall (50) can include a radially inner end region (62) and a radially outer end region (64). The radially outer end region (64) can include an outer peripheral surface (66) of the cast wall (50). The outer peripheral surface (66) can be generally cylindrical in conformation. The radially outer end (67) of the wall (50) can be chamfered or beveled. The wall (50) can transition to another portion of the bearing housing (52), such as the nose (68), at the radially inner end region (62) thereof.

The wall (50) can have any suitable configuration. For instance, the wall (50) can be generally disc-shaped. Unlike prior heat shield designs, the wall (50) may not include a flange. The wall (50) can have an associated thickness (T). The thickness (T) of the wall (50) can be substantially constant, or the thickness (T) of the wall (50) may not be constant. As an example, the thickness (T) of the wall (50) can increase going from the radially inner end region (62) of the wall (50) to the radially outer end region (64).

Figure 3A:
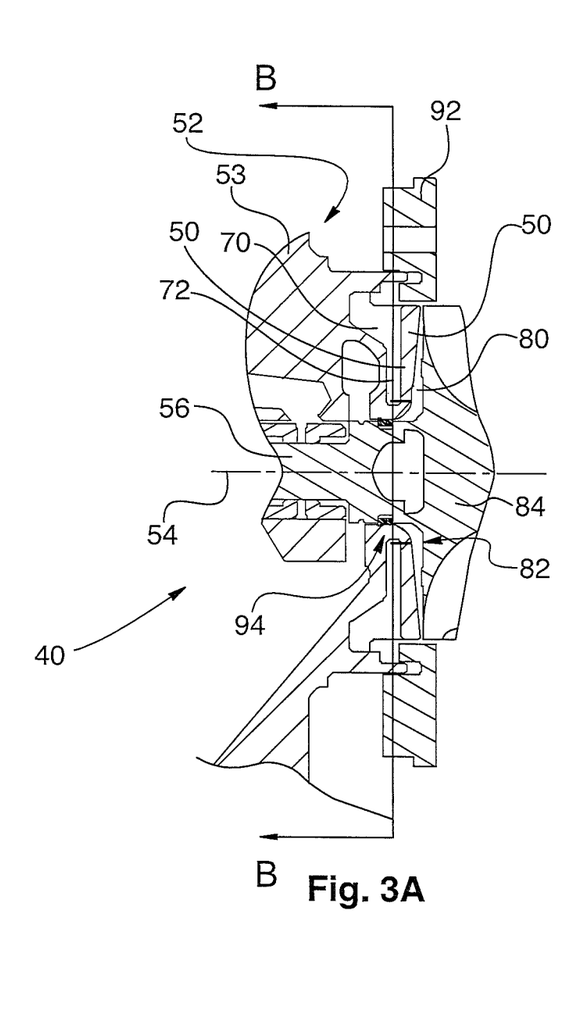
FIG. 3A is a cross-sectional view of a turbocharger having an integrated heat shield.
Figure 3B:
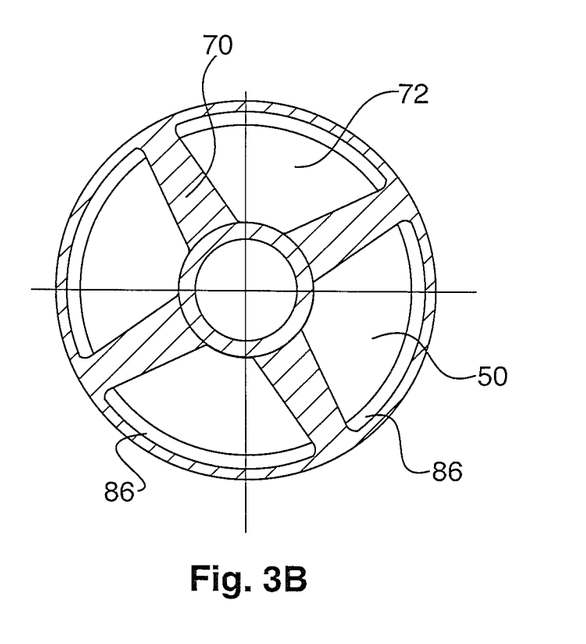
FIG. 3B shows a cross-sectional view of the heat shield of FIG. 3A, viewed along line B-B.
Figure 5:
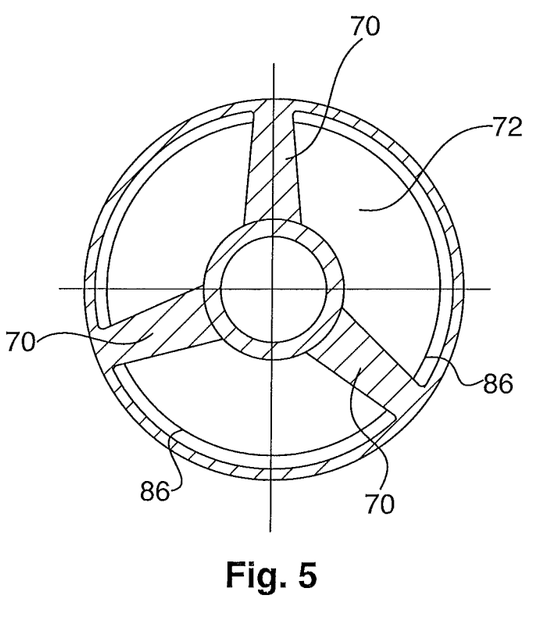
FIG. 5 shows an alternative arrangement of a heat shield.

The wall (50) can be supported on the bearing housing (52) in any suitable manner. For instance, support can be provided by a plurality of ribs (70) connecting the wall (50) to a main body (53) of the bearing housing (52). There can be any suitable quantity of ribs (70). In one embodiment, there can be about four ribs (70), as is shown in FIG. 3B. In other embodiments, there can be fewer or greater ribs (70). The ribs (70) can have any suitable size, shape and configuration. The ribs (70) can have any suitable thickness (into and/or out of the page in FIG. 4). Further, the ribs (70) can extend at any suitable angle relative to the compressor-facing surface (60). The ribs (70) can be substantially identical to each other, or one of the ribs (70) can differ from the other ribs (70) in one or more respects. The ribs (70) can be equally spaced (as is shown in FIG. 3B). However, in other instances, the ribs (70) can be non-equally spaced, as is shown in FIG. 5. In at least some instances, the wall (50) can be connected to the main body (53) solely by the plurality of ribs (70).

With the inclusion of the wall (50) in the bearing housing (52), a chamber (72) can be formed. The chamber (72) can be generally defined between the wall (50) and the rest of the bearing housing (52). More particularly, the chamber (72) can be defined at least in part by the compressor facing surface (60) of the wall (50) and one or more surfaces of the bearing housing (52), including one or more turbine facing surfaces (74), one or more generally radially inward facing walls (76) of the bearing housing (52), one or more generally radially inwardly facing surfaces (76) of the bearing housing and/or one or more generally radially outwardly facing surfaces (78) of the bearing housing (52). The chamber (72) can also be defined by neighboring pairs of the ribs (70). While FIGS. 3A and 4 show only a single chamber (72), it will be appreciated that a plurality of chambers (72) can be formed with adjacent chambers (72) being separated by a rib (70).

Arrangements herein can provide an entry and an exit for exhaust flow through the chamber (72). A volume (80) can be defined between the turbine wheel facing surface (58) of the wall (50) and the backface (82) of the turbine wheel (84). It should be noted that the turbine wheel facing surface (58) can be configured to provide a desired arrangement for the volume (80). One or more passages (86) can be provided in the bearing housing (52) to permit fluid communication between the chamber (72) and the volume (80). As will be described in more detail below, these passages (86) can define an exit path from the chamber (72) to the volume (80).

In one embodiment, there can be a plurality of passages (86). The passages (86) can have any suitable size, shape and/or other characteristics and features. In one embodiment, the passages (86) can be configured as generally circumferential slots. The passages (86) can be distributed in any suitable manner. For instance, the passages (86) can be generally equally spaced. In some embodiments, the passages (86) may be unequally spaced. The passages (86) can be substantially identical to each other, or at least one of the passages (86) can differ from the other passages in one or more respects, including any of those described above.

The passages (86) can be provided in any suitable location. In one embodiment, the passages (86) can extend through the wall (50) from the compressor facing surface (60) to the turbine wheel facing surface (58). Alternatively or in addition, the passages (86) can extend through a portion of the bearing housing (52), such as the nose (68). The passages (86) can extend at any suitable orientation. As an example, the passages (86) can extend substantially parallel to the longitudinal axis (54) of a shaft bore (55) in the bearing housing (52), the shaft bore receiving a rotatable shaft (56) therein. Alternatively, the passages (86) can extend substantially perpendicular to the axis (54). Still alternatively, the passages (86) can extend at any suitable angle between these two positions. The one or more passages (86) can be optimized in multiple radial positions to attain ideal pressure ratios. The passages (86) can be formed in any suitable manner, such as by casting and/or machining.

An entry to the chamber (72) can be provided. Such entry can be provided through the annulus (88), generated by the outside peripheral surface (66) of the heat shield wall (50) and a portion of a turbine housing (93), which can be the inner diameter (90) of the lower vane ring (92) for a variable turbine geometry (VTG) type of turbocharger. For a non-VTG type of turbocharger, the joint between turbine housing mounting/piloting flange and bearing housing pilot, would be such that a similar flow path is available for entry of exhaust gas to the chamber (72). When the turbocharger (40) is in operation (e.g., the shaft (56) is rotating at high speed), the rotation of backface (82) of the turbine wheel (84) in a volume (80) with the non-rotating wall (50) can produce a forced vortex in the volume (80) behind the turbine wheel (84). In a forced vortex, the particle velocity closest to the center is low, with the velocity increasing proportionally to the radius of rotation. The greater the velocity, the lower the pressure, so the forced vortex causes there to be a low pressure in the volume (80) behind the rotating turbine wheel (84).

Figure 6:
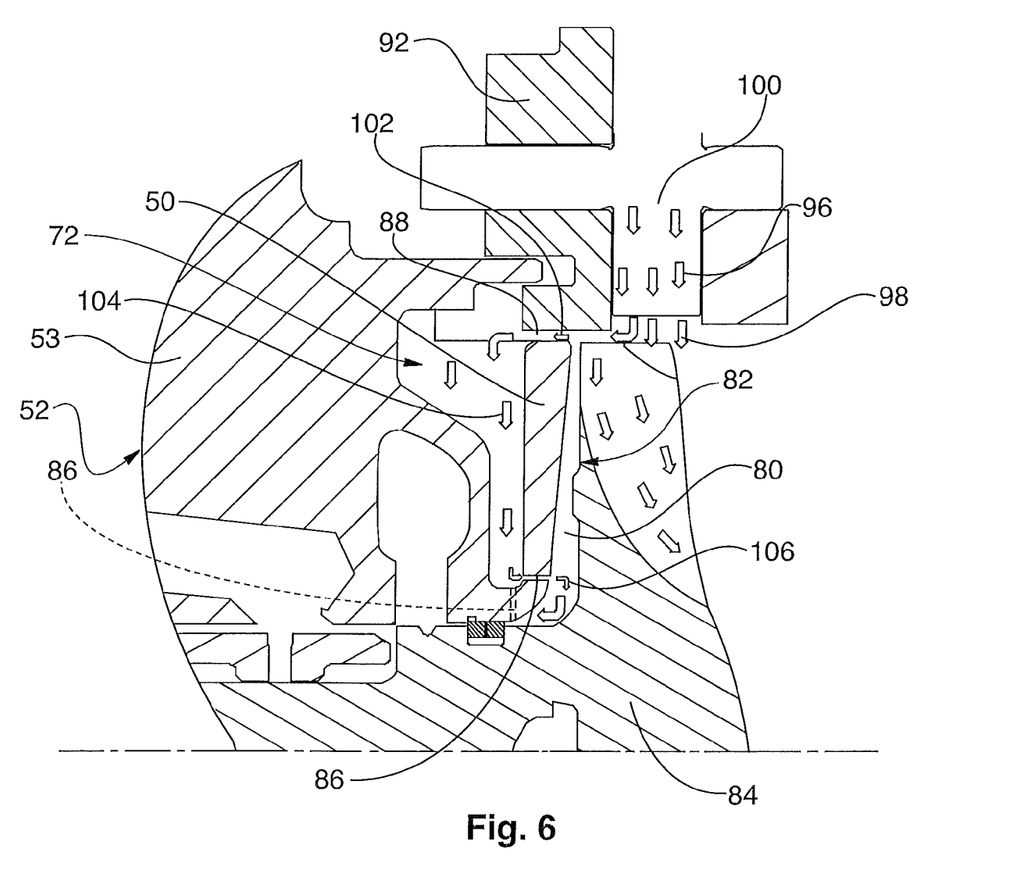
FIG. 6 is a close-up view of the turbocharger having an integrated heat shield, showing airflow in the region around the heat shield.
Figure 7:
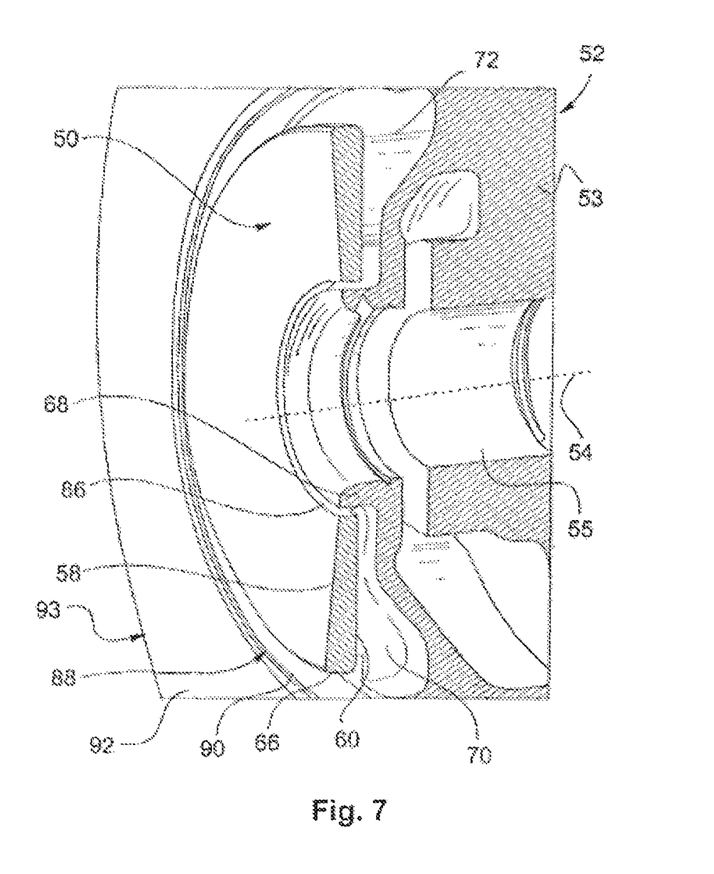
FIG. 7 is a cross-sectional view of a portion of a bearing housing with an integrated heat shield wall.

This low pressure behind the backface (82) of the turbine wheel (84) can cause low pressure to develop on the outboard side of the turbine-end piston ring(s) (94), which are at the effective inboard end of the volume (80) behind the turbine wheel (84). This makes for an unfavorable pressure gradient across the piston ring(s) (i.e., a gradient which promotes the flow of gas and oil from inside the bearing housing (52) into the turbine stage). The oil, soot, and gas can damage the catalyst, which is downstream of the turbine wheel (84). However, by providing a path of high pressure exhaust gas through the chamber (72) (that is, around the turbine wheel backface (82)), the pressure gradient across the piston ring(s) (94) can become more favorable to preventing this passage of oil, soot, and gas into the turbine stage. In this way, an effective The flow of exhaust gas (96) out of the turbine housing volute (98) is directed by the vanes (100) of a VTG, and thence the flow (102) off the VTG vane, flows to the entry of the turbine wheel (84), when the turbo is a VTG, or the flow (96) out of the volute (98) flows directly onto the entry of the turbine wheel (84). In either case, some recirculation flow (102) turns to flow through the annulus (88). The entry recirculation flow (102) from the recirculation inlet annulus (88) then flows into the chamber (72). The recirculation flow (104) in the chamber (72) can flow toward the one or more passages (86), where it can exit the recirculation chamber (72). Some recirculation flow (106) passes through the one or more passages (86) to increase the pressure in the volume (80) between the rotating backface (82) of the turbine wheel (84) and the static turbine wheel facing surface (58) of the wall (50). As explained above, such increase in pressure can make the pressure differential across the turbine-end piston ring seal (94) more favorable.

Embodiments described herein can address many issues experienced with prior heat shield designs in which the heat shield is a separate component. As described above, embodiments herein provide a design in which the function of heat shield is provided by the details in the casting of the bearing housing, such as the nose thereof. Such a design allows a chamber behind the wall of the nose of the bearing housing, larger than would be attainable in the prior separate heat shield configurations. Such increased volume can facilitate turbine end cooling.

Further, embodiments herein can provide closer matching of the bore in the wall (the heat shield) with the outside of the ring boss of the shaft and wheel as the inside diameter of what was formerly the "heat shield" can now be defined during the typical machining on the nose of the bearing housing. By casting the turbine heat shield integral to the bearing housing, this invention provides a heat shield which can be accurately machined as part of the bearing housing machining and which does not present the problems of a loose heat shield for the core balance operation or any assembly problems which have clamp load ramifications. In addition, since the heat shield is integrated with the bearing housing, there is no longer a need to restrain the heat shield on the bearing housing, thereby saving time and cost.

Further, the integrated heat shield configuration can be applied to VTG turbochargers as well as non-VTG turbochargers. In addition, the heat shield configuration described herein can facilitate the use of a split bearing housing, as the ribs can be designed accordingly. Still further, the heat shield configuration described herein can facilitate the assembly/processing stage of the core assembly (the assembly of the rotating assembly in the supporting bearing housing). With the above-described configuration, the heat shield is kept from touching the rotating assembly during this procedure without the use of additional retaining mechanisms.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible within the scope of the following claims.

The invention claimed is:

1. A bearing housing (52) for a turbocharger comprising:
   a main body (53);
   a radially outwardly extending heat shield wall (50), the heat shield wall (50) and the main body (53) being formed together as a unitary structure and connected by a plurality of ribs (70), the heat shield wall (50) being spaced from the main body (53) such that a plurality of chambers (72) are formed, each chamber (72) being at least partly defined by the heat shield wall (50), the main body (53) and neighboring pairs of ribs (70); and
   at least one passage (86) extending through the bearing housing (52) to permit fluid communication between the plurality of chambers (72) and outside of the bearing housing (52), whereby an exit from the plurality of chambers (72) is provided.

2. The bearing housing of claim 1, wherein the heat shield wall (50) is connected to the main body (53) exclusively by the plurality of ribs (70).

3. The bearing housing of claim 1, wherein the plurality of ribs (70) are substantially equally spaced.

4. The bearing housing of claim 1, wherein the at least one passage (86) is a circumferential slot.

5. The bearing housing of claim 1, wherein the at least one passage (86) extends substantially perpendicular to an axis (54) of a shaft bore (55) in the bearing housing (52).

6. The bearing housing of claim 1, wherein the at least one passage (86) extends substantially parallel to an axis (54) of a shaft bore (55) in the bearing housing (52).

7. The bearing housing of claim 1, wherein the heat shield wall (50) has an associated thickness, wherein the thickness of the heat shield wall (50) increases from a radially inner end region (62) to a radially outer end region (64) thereof.

8. The bearing housing of claim 1, wherein the at least one passage (86) is formed in a radially inner end region (62) of the heat shield wall (50).

9. A turbocharger system comprising:
   a bearing housing (52) having a main body (53) with a shaft bore (55) for receiving a rotatable shaft therein, the shaft bore (55) having an associated longitudinal axis (54), the bearing housing (52) further including a radially outwardly extending heat shield wall (50), the heat shield wall (50) and the main body (53) being formed together as a unitary structure and connected by a plurality of ribs (70), the heat shield wall (50) being spaced from the main body (53) such that a plurality of chambers (72) are formed, each chamber (72) being at least partly defined by the heat shield wall (50), the main body (53) and neighboring pairs of ribs (70); and
   a shaft (56), at least a portion of the shaft (56) being rotatably received within the shaft bore (55);
   a turbine wheel (84) being provided at one end of the shaft (56), the turbine wheel (84) including a backface (82), the heat shield wall (50) being disposed between the main body (53) and the backface (82) of the turbine wheel (84) such that a volume (80) is at least partially defined between the heat shield wall (50) and the backface (82); and
   at least one passage (86) extending through the bearing housing (52) to permit fluid communication between the plurality of chambers (72) and the volume (80), whereby an exit from the plurality of chambers (72) is provided.

10. The turbocharger system of claim 9, wherein the heat shield wall (50) is connected to the main body (53) exclusively by the plurality of ribs (70).

11. The turbocharger system of claim 9, wherein the plurality of ribs (70) are substantially equally spaced.

12. The turbocharger system of claim 9, wherein the at least one passage (86) is a circumferential slot.

13. The turbocharger system of claim 9, wherein an entry to the plurality of chambers (72) is defined between an outer peripheral surface (66) of the heat shield wall (50) and a portion of a stationary structure of a turbine housing (18).

14. A method of forming a bearing housing for a turbocharger comprising:
   casting a bearing housing (52) having a main body (53) and a radially outwardly extending heat shield wall (50), whereby the main body (53) and the heat shield wall (50) are a unitary structure and connected by a plurality of ribs (70), the heat shield wall (50) being spaced from the main body (53) such that a plurality of chambers (72) are formed, each chamber (72) being at least partly defined by the heat shield wall (50), the main body (53), and neighboring pairs of ribs (70).

15. The method of claim 14, further including:
   forming at least one passage (86) in the bearing housing (52) to permit fluid communication between the plurality of chambers (72) and outside of the bearing housing (52), whereby an exit from the plurality of chambers (72) is provided.

* * * * *